Patented Jan. 16, 1923.

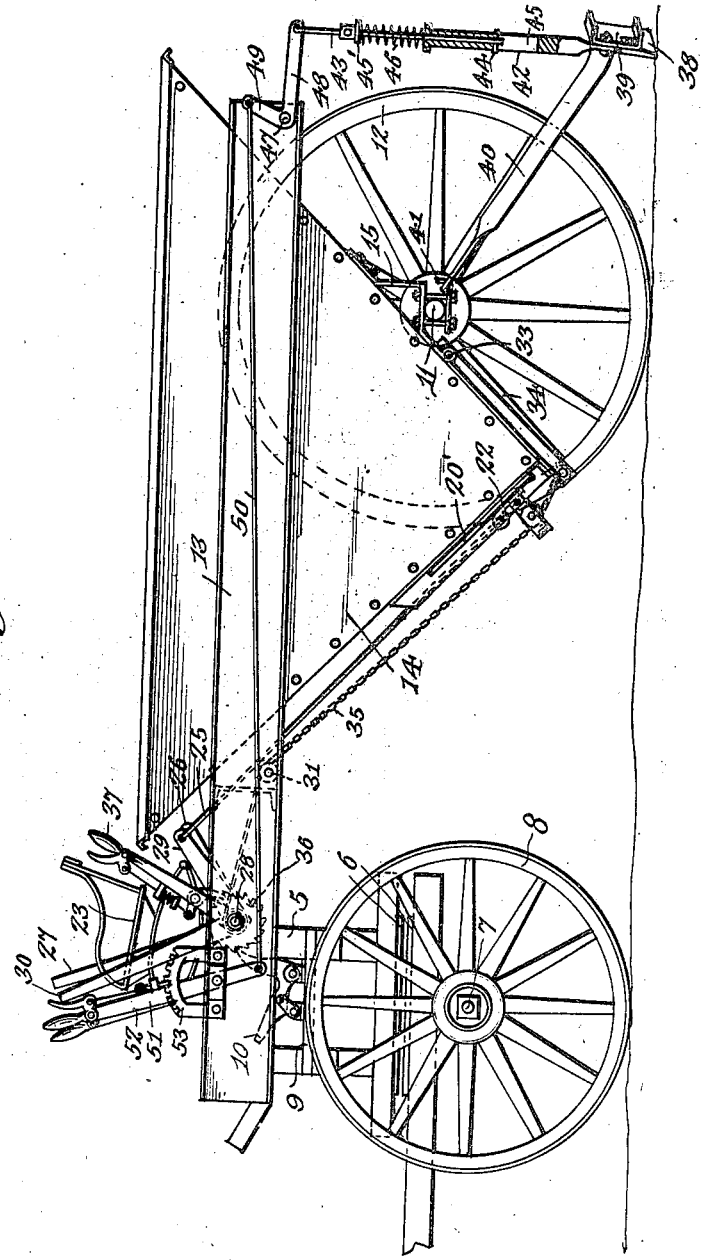

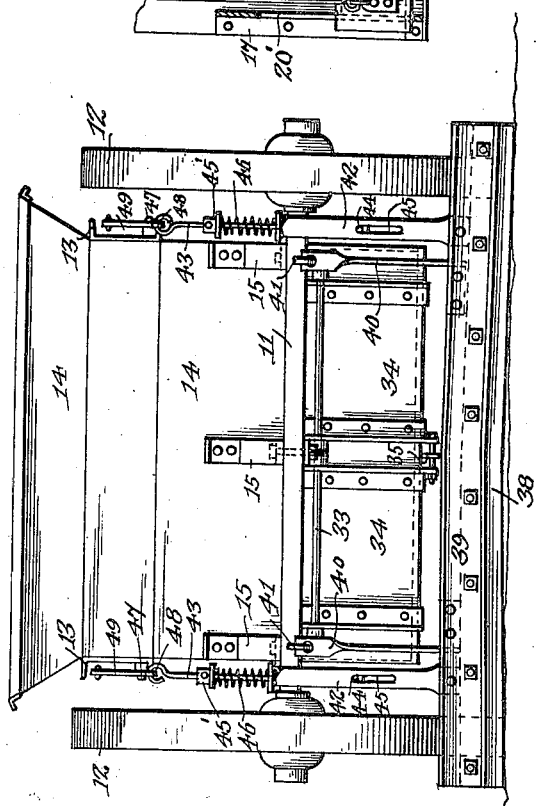

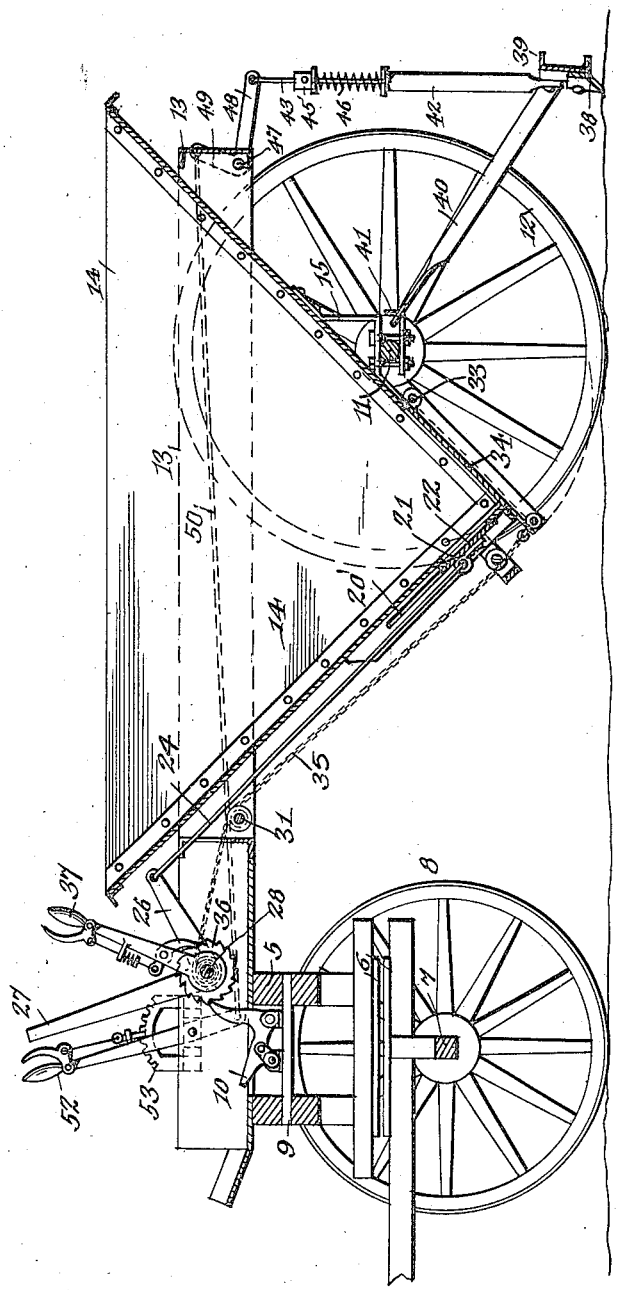

1,442,650

UNITED STATES PATENT OFFICE.

FRED D. COPPOCK, OF GREENVILLE, OHIO.

DUMPING WAGON.

Application filed June 17, 1922. Serial No. 569,117.

*To all whom it may concern:*

Be it known that I, FRED D. COPPOCK, a citizen of the United States, residing at Greenville, in the county of Darke and State of Ohio, have invented certain new and useful Improvements in Dumping Wagons, of which the following is a specification.

This invention relates to dumping wagons for conveying and discharging material, especially on public highways, or for any other purposes wherein it is found applicable, and has for its object to provide a wagon of such class, in a manner as hereinafter set forth, with means operated from the driver's seat for absolutely controlling the distribution of the load on the wagon.

A further object of the invention is to provide a dumping wagon in a manner as hereinafter set forth, with a hopper shape bottom having as a part thereof, a sectional sliding gate for controlling the distribution of the load, and is so set up that each section thereof can be opened or closed independently of the other or the sections of the gate open or close simultaneously and by such arrangement the load can be deposited at any desired point and in any suitable quantity.

A further object of the invention is to provide a dumping wagon, in a manner as hereinafter set forth, with a hopper shape bottom having as a part thereof a normally locking hinged gate operated from the driver's seat, and which when released causes the discharge of the entire load.

A further object of the invention is to provide a dumping wagon in a manner as hereinafter set forth with means operated from the driver's seat and arranged at the rear of the body of the vehicle for grading purposes.

Further objects of the invention are to provide a dumping wagon which is simple in its construction, strong, durable, efficient in its use, conveniently operated, readily set up and comparatively inexpensive to manufacture.

With the foregoing and other objects in view the invention consists of the novel construction, combination, and arrangement of parts, as hereinafter more specifically set forth and illustrated in the accompanying drawings wherein is shown an embodiment of the invention, but it is to be understood that changes, variations and modifications can be resorted to which come within the scope of the claims hereunto appended.

Referring to the drawings in detail wherein like reference characters denote corresponding parts throughout the several views:—

Figure 1 is a side elevation of a dumping wagon in accordance with this invention, Figure 2 is a rear elevation, Figure 3 is a view illustrating the sectional sliding gate.

Figure 4 is a longitudinal sectional view.

The dumping wagon in accordance with this invention can be so set up as to be a team drawn vehicle or an independent motor propelled truck.

Referring to the drawings in detail, the wagon is shown as being a team drawn vehicle, by way of example; 5 denotes the front bolsters of the vehicle, 6 the fifth wheel, 7 the front axle and 8 the front wheels, only one of which is shown. The elements 5, 6, 7 and 8 may be of any suitable construction, with the exception that the bolsters 5 are spaced from each other and have secured therewith a support 9 for a trip mechanism 10, to be hereinafter referred to.

The rear axle of the wagon is indicated at 11 and is provided with the rear wheels 12.

Mounted on the bolsters 5 and extending rearwardly therefrom, is the chassis or supporting frame for the wagon body 14, the latter is fixedly secured to the frame 13, in any suitable manner and projects above and depends below said frame 13 and is of hopper-like formation. The body portion 13 is secured to the rear axle by suitable coupling devices as at 15.

The forward wall 16 of the body portion 14 has secured to its outer face a pair of outer slotted guides 17 and an intermediate guide 18. The guides 17 and 18 are arranged near the lower end of the forward wall 16, the latter being stationary. The forward wall 16 in proximity to its lower end is formed with a pair of rectangular outlet openings 19 which are closed by sectional sliding gate, the latter being formed of the sections 21 and 22. The section 21 is employed for closing one of the openings 19 and the section 22 for like purpose for the closing of the other of the openings 19. The inner ends of the sections 21 and 22 of the gate travel on the guide 18, the outer end of the section 21 travels in the guide 17 and the outer end of the section 22 travels in the other guide 17. Slots 20' are provided in the guides 17 for the sections 21, 22. The sections 21 and 22 can be operated independently with respect to each other or simultaneously. The openings 21 and 22 are provided for the purpose of distributing the material at any point desired.

The sections 21 and 22 are controlled from the driver's seat 23 and to the section 21 is attached an actuating element 24 and to the section 22 an actuating element 25. The actuating element 24, is connected to a crank shaft 26 which associates with a lever 27 mounted on the shaft 28. The actuating elements 24, 25, are connected to the gate sections as at 20. The actuating element 25 is attached to a crank shaft 29, which associates with a lever 30 mounted on the shaft 28. A roller shaft 31 is mounted at the forward portion of the chassis or frame 13 and over which passes the elements 24, 25. The rear wall of the body portion 14, terminates at a point above the lower end of said body portion and said rear wall has hinged thereto, as at 33, a closure gate 34 which acts as a means to close the rear of the body portion 14, and when the gate 34 is released the entire load can be discharged. Attached to the lower terminus of the gate 34 are flexible members 35 which wind on and unwind from the shaft 28, and the winding action of the shaft 26 is had through the medium of a ratchet 36 and a lever mechanism 37. The trip 10 associates with a ratchet 36 for holding the shaft 26 from movement, so that when the trip is automatically shifted to release the ratchet the weight of the load against the gate 34 will swing outwardly whereby the load can be discharged. On actuation of the lever 37, the member or members 35 will be wound on the shaft or drum 28 whereby the gate 34 will be brought to closed position, and maintained in such position by the engagement of the trip 10 with the ratchet 36. The flexible member or members 35 travel over the roller 31.

The wagon is provided with a grading device and means for controlling the same. The grading device is supported from the rear of the wagon and the means for controlling it is operated from the driver's seat.

The grading device consists of a crowned grading blade 38, secured to a carrier 39, the latter being in the form of a flanged beam which is supported from the rear of the wagon by inclined brace members 40, which are secured to the carrier 39, and connected with the rear axle 11 by the hooks 41. A pair of controlling devices is provided for the grading device and each consists of a rod 42 having a bar 43 telescope therewith. The bar 43 has a stop pin 44 which extends through a slot 45 in the rod 42. Mounted on the bar 43 and interposed between the top of the rod 42 and a stationary disk 45, on the rod 43, is a coiled compression holding down spring 46. Pivotally connected to the frame 13 as at 47 is a bell crank lever having one of its arms 48 connected with the rod 43. The other arm 49 of the bell crank is attached to an elongated pulling member 50 which travels over the roller 31 and is attached to the lever 51. The other actuating element is attached to a lever 52. A pawl and ratchet mechanism is provided for maintaining the levers 51 and 52 from movement, thereby maintaining the blade 38 in position to which it has been adjusted.

The various levers which are associated with the sectional gate or hinged gate and grading blade, as well as the release for the hinged gate, are arranged in close proximity to the driver's seat so that all control can be had when occasion so requires.

It is obvious from the foregoing construction and arrangement of parts relative to the sliding gate that a means is provided whereby absolute control of the disposition of the load can be had when occasion requires, and that furthermore relative to the hinged gate and its connecting devices, it can be quickly and conveniently released to discharge the entire load. It is also obvious that owing to the manner in which the grading blade is set up, through its connections, it can be adjusted when occasion so requires in view of the fact that the braces 40 swing on the hooks 41.

What I claim is:—

1. In a dumping wagon a body portion and gates for controlling the distribution of the material from said body portion, a controllable grading blade supported from the rear of said body portion, and means in proximity of the driver's seat of the wagon for controlling said gates and grading element.

2. A dumping wagon comprising a body portion having an outlet for the distribution of material from said body, a gate formed of a plurality of sections controlling the distribution of the material through said outlet, a controllable grading blade supported from the rear of said body portion, and means in proximity of the driver's seat of the wagon for controlling said gates and grading elements.

3. A dumping wagon comprising a body portion in the form of a hopper, controllable means carried by the front wall of said body portion for controlling the discharge of material therefrom, means carried by the rear wall of said body portion to provide for the discharge of the entire load, a controllable grading blade supported from the rear of said body portion, and means in proximity to the driver's seat of the wagon for controlling said gates and grading elements.

4. In a dumping vehicle, a body portion in the form of a hopper having the front and rear walls provided with openings for discharging material from said body portion, a controllable hinged gate for closing the opening in the rear wall of said body portion, a controllable sliding gate formed of two sections for closing and controlling discharge from the opening in the front wall of said body portion, and means arranged in close proximity to the driver's seat of the vehicle for independently controlling the said hinged gate and each of the sections of the sectional gate.

5. In a dumping vehicle a body portion, means for distributing material carried thereby, a grading blade supported from the rear of said body portion, a spring control adjusting means for said blade, and means connected to said adjusting means for elevating and lowering said blade.

6. In a dumping vehicle a body portion provided at its front and rear with an outlet, a hinged gate for closing the outlet at the rear, a sliding gate formed of two independently movable sections for controlling the distribution of material discharged through the outlet at the front of the body portion.

7. In a dumping vehicle a body portion provided at its front and rear with an outlet, a hinged gate for closing the outlet at the rear, a sliding gate formed of two independently movable sections for controlling the distribution of material discharged through the outlet at the front of the body portion, means at the front of said body portion for controlling the hinged gate, and means at the front of said body portion for independently controlling the sections of the sectional gate.

8. A dumping vehicle comprising a hopper shaped body portion, said body portion having an opening for discharge in the front thereof, a sliding gate formed of a plurality of sections for controlling the distribution of material discharged through said outlet, means extended along the front of the body portion for independently or simultaneously actuating said sections to control discharge through said outlet, said body portion having its rear provided with an outlet, a hinged gate for closing said outlet, and means extended along the front of said body portion for controlling said hinged gate.

9. A dumping vehicle comprising a hopper shaped body portion, said body portion having an opening for discharge in the front thereof, a sliding gate formed of a plurality of sections for controlling the distribution of material discharged through said outlet, means for independently or simultaneously actuating said sections to control discharge through said outlet, said body portion having its rear provided with an outlet, a hinged gate for closing said outlet, means for controlling said hinged gate, a grading blade adjustably supported from the rear of said body portion, and controlling means for said blade.

10. In a dumping vehicle, a driver's seat, a body portion, means operated from a point in proximity to the driver's seat and extended along the front of said body portion for affecting the discharge of the material from the body portion at the rear thereof, means operated from a point in proximity to the driver's seat and extended along the front of said body portion for controlling the distribution of the discharge of material at two points when discharged through the front of said body portion.

11. In a dumping vehicle, a driver's seat, a body portion, means operated from a point in proximity to the driver's seat for affecting the discharge of the material from the body portion at the rear thereof, means operated from a point in proximity to the driver's seat for controlling the distribution of the discharge of material when discharged through the front of said body portion, a grading blade adjustably supported from the rear of said body portion, and means operated from a point in close proximity to the driver's seat for adjusting the position of said blade.

12. In a dumping vehicle, a hopper shaped body portion, an operator's seat arranged forwardly thereof, said body portion having its front formed with a discharge opening and its rear provided with a discharge opening, a pair of slidable closure elements for controlling the distribution of material discharged through the opening in the front of the body portion, a hinged closure for controlling the discharge of material through said opening at the rear of the body portion, a pair of lengthwise elements extending along the front of the body portion for independently or simultaneously shifting said slidable closures to control discharge through the opening at the front of the body portion, a windable element extending along the front of the body portion for controlling the opening movement of said hinged closure, and means mounted on the operator's seat for operating said lengthwise shiftable and windable elements.

13. In a dumping vehicle, a hopper shaped body portion, an operator's seat arranged forwardly thereof, said body portion having its front formed with a discharge opening and its rear provided with a discharge opening, a pair of slidable closure elements for controlling the distribution of material discharged through the opening in the front of the body portion, a hinged closure for controlling the discharge of material through said opening at the rear of the body portion, a pair of lengthwise elements extending along the front of the body portion for independently or simultaneously shifting said slidable closures to control discharge through the opening at the front of the body portion, a windable element extending along the front of the body portion for controlling the opening movement of said hinged closure, means mounted on the operator's seat for operating said lengthwise shiftable and windable elements, a grading blade adjustably supported from the rear of said body portion, and means extending along both sides of the body portion and actuated from the operator's seat for elevating and lowering said blade.

In testimony whereof, I affix my signature hereto.

FRED D. COPPOCK.